(12) United States Patent
Al-Husseini

(10) Patent No.: US 12,695,747 B2
(45) Date of Patent: Jul. 28, 2026

(54) SYSTEM AND METHOD FOR IDENTIFYING AND AUTHENTICATING UNIFORMED PERSONNEL

(71) Applicant: U.S. Army DEVCOM, Army Research Laboratory, Adelphi, MD (US)

(72) Inventor: Mahdi Al-Husseini, Douglasville, GA (US)

(73) Assignee: America as represented by the Secretary of the Army, Washington, DC (US)

( * ) Notice: Subject to any disclaimer, the term of this patent is extended or adjusted under 35 U.S.C. 154(b) by 464 days.

(21) Appl. No.: 18/131,301

(22) Filed: Apr. 5, 2023

(65) Prior Publication Data

US 2023/0344831 A1     Oct. 26, 2023

Related U.S. Application Data

(60) Provisional application No. 63/334,099, filed on Apr. 23, 2022.

(51) Int. Cl.
| | |
|---|---|
| *H04L 9/40* | (2022.01) |
| *G06V 10/74* | (2022.01) |
| *G06V 20/62* | (2022.01) |
| *G06V 30/14* | (2022.01) |

(52) U.S. Cl.
CPC ........ *H04L 63/0884* (2013.01); *G06V 10/761* (2022.01); *G06V 20/63* (2022.01); *G06V 30/1444* (2022.01)

(58) Field of Classification Search
CPC .. G06V 10/761; G06V 20/63; G06V 30/1444; G06V 40/10; H04L 63/0884
See application file for complete search history.

(56) References Cited

U.S. PATENT DOCUMENTS

| | | | | |
|---|---|---|---|---|
| 7,362,210 | B2 * | 4/2008 | Bazakos | ............... G07B 15/04 |
| | | | | 340/5.82 |
| 9,579,068 | B2 | 2/2017 | Gelbman et al. | |
| 10,372,978 | B1 * | 8/2019 | Smith | .................... G06V 20/30 |
| 10,817,841 | B1 | 10/2020 | Weiss et al. | |

(Continued)

OTHER PUBLICATIONS

Continuous RFID-enabled Authentication and its Privacy Implications. Kurkovsky et al. (Year: 2010).*

(Continued)

*Primary Examiner* — Delomia L Gilliard
(74) *Attorney, Agent, or Firm* — Eric B. Compton

(57)     ABSTRACT

Disclosed herein are systems, methods and devices for identifying, verifying, and authenticating information attained from an individual's worn uniform. The novel technology captures images of uniformed members accessing on-installation facilities, uses computer vision filter and machine learning techniques to identify valuable on-uniform information, and then matches that information with a registered database of names for proper identification, verification, and optional authentication. The rapid identification, verification, and authentication of uniformed personnel significantly reduces the need to fill out excessive paperwork, saves valuable time, and generally streamlines bureaucracy across on-installation facilities.

25 Claims, 7 Drawing Sheets

(56)                References Cited

U.S. PATENT DOCUMENTS

| | | | | |
|---|---|---|---|---|
| 2013/0044944 | A1* | 2/2013 | Wang | G06F 18/24323 |
| | | | | 707/769 |
| 2016/0110786 | A1* | 4/2016 | Herring | G01B 11/00 |
| | | | | 705/26.35 |
| 2017/0069036 | A1* | 3/2017 | Shaaban | G06Q 10/1091 |
| 2019/0080274 | A1* | 3/2019 | Kovach | G06Q 10/0639 |
| 2019/0392700 | A1* | 12/2019 | Darling | G08B 13/19684 |
| 2020/0151437 | A1* | 5/2020 | Egger | G06V 40/103 |
| 2022/0269268 | A1* | 8/2022 | Lau | G06V 20/52 |
| 2022/0292170 | A1* | 9/2022 | Khadloya | G06F 18/22 |
| 2024/0112385 | A1* | 4/2024 | Root | G06T 3/40 |

OTHER PUBLICATIONS

"U.S. Army Ranks," U.S. Army, webpage available at https://www.army.mil/ranks/ (accessed before Apr. 5, 2022).

"Army Uniforms," U.S. Army, webpage available at https://www.army.mil/uniforms/ (accessed before Apr. 5, 2022).

"U.S. Military Rank Insignia," U.S. Department of Defense, webpage available at: https://www.defense.gov/Our-Story/Insignias/ (accessed before Apr. 5, 2022).

"Image Segmentation: The Basics and 5 Key Techniques" Datagen, available at: https://datagen.tech/guides/image-annotation/image-segmentation/ (accessed before Apr. 5, 2022).

Gaudenz Boesch, "Object Detection in 2023: The Definitive Guide, 2023," viso.ai, available online at: https://viso.ai/deep-learning/object detection/.

Johannes Rieke, "Object detection with neural networks—a simple tutorial using keras," Towards Data Science, 2017, available online at: https://towardsdatascience.com/object-detection-with-neural-networks-a4e2c46b4491.

J. Simpson, "8 APIs for Two-Factor Authentication," Nordic Apis, Dec. 17, 2019, available at: https://nordicapis.com/8-apis-for-two-factor-authentication/.

8—KH Wong, "Ch. 9: Introduction to Convolution," Presentation, available at: https://slideplayer.com/slide/13245093/ (accessed before Apr. 5, 2022).

* cited by examiner

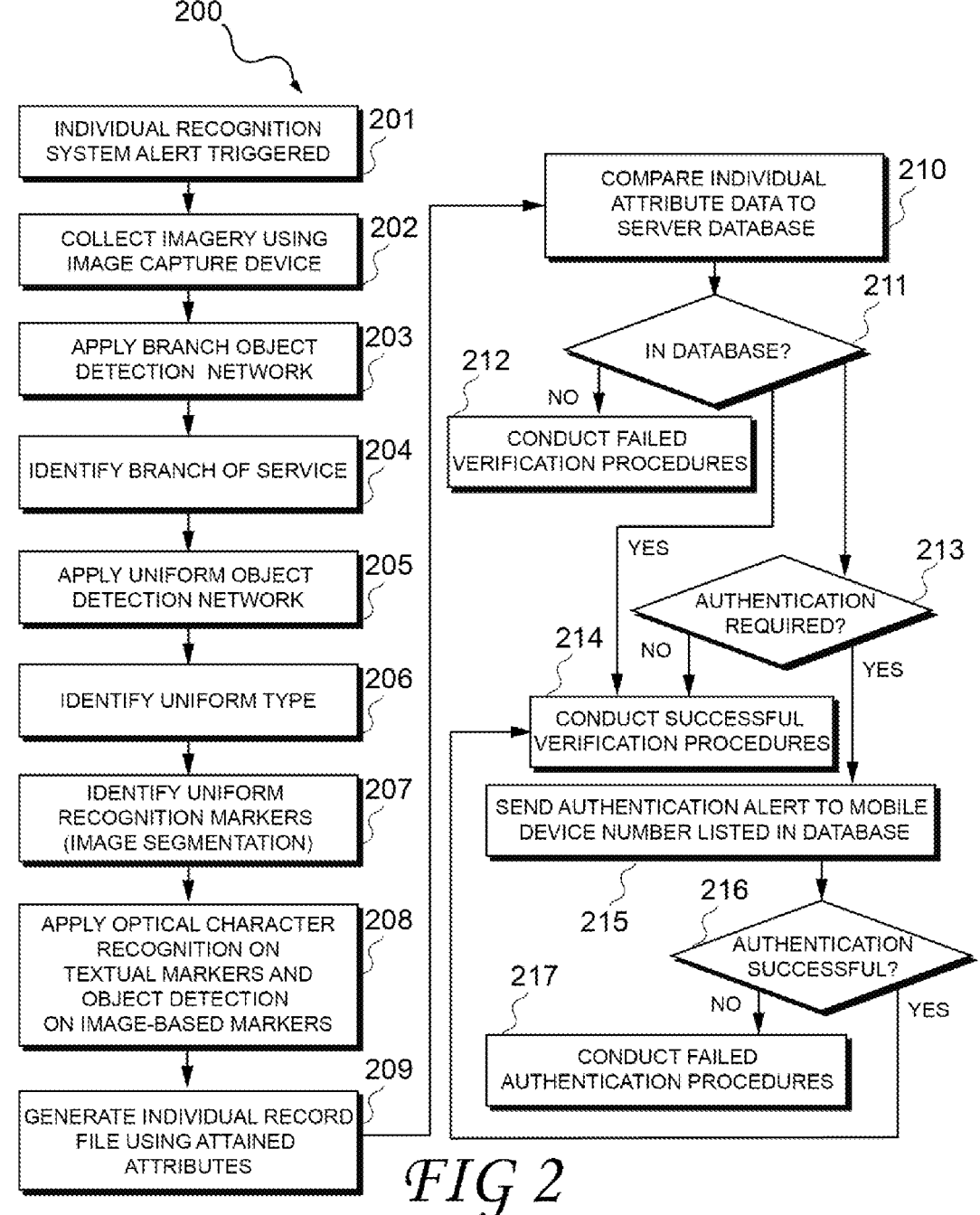

200

201 INDIVIDUAL RECOGNITION SYSTEM ALERT TRIGGERED

202 COLLECT IMAGERY USING IMAGE CAPTURE DEVICE

203 APPLY BRANCH OBJECT DETECTION NETWORK

204 IDENTIFY BRANCH OF SERVICE

205 APPLY UNIFORM OBJECT DETECTION NETWORK

206 IDENTIFY UNIFORM TYPE

207 IDENTIFY UNIFORM RECOGNITION MARKERS (IMAGE SEGMENTATION)

208 APPLY OPTICAL CHARACTER RECOGNITION ON TEXTUAL MARKERS AND OBJECT DETECTION ON IMAGE-BASED MARKERS

209 GENERATE INDIVIDUAL RECORD FILE USING ATTAINED ATTRIBUTES

210 COMPARE INDIVIDUAL ATTRIBUTE DATA TO SERVER DATABASE

211 IN DATABASE?

212 NO → CONDUCT FAILED VERIFICATION PROCEDURES

YES

213 AUTHENTICATION REQUIRED?

214 NO → CONDUCT SUCCESSFUL VERIFICATION PROCEDURES

YES → SEND AUTHENTICATION ALERT TO MOBILE DEVICE NUMBER LISTED IN DATABASE

215

216 AUTHENTICATION SUCCESSFUL?

217 NO → CONDUCT FAILED AUTHENTICATION PROCEDURES

YES

*FIG 2*

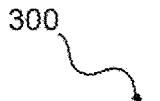
FIG 3

400

410

BRANCH + UNIFORM OBJECT
DETECTION NETWORK

420

BRANCH: US Army
UNIFORM: Dress

430

CONTINUE TO TAILORED
IMAGE SEGMENTATION 600
140
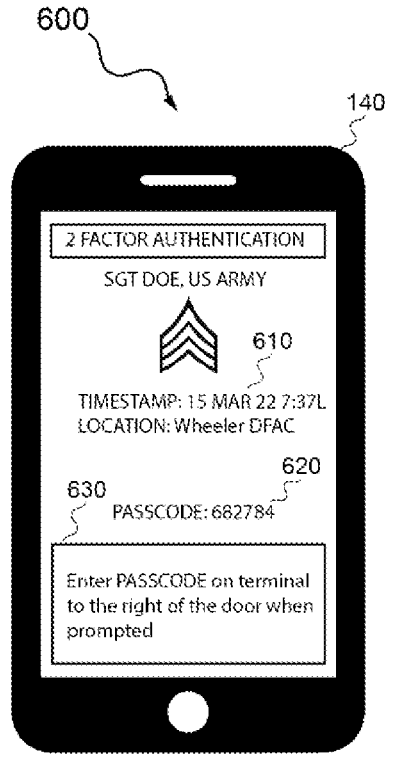
650
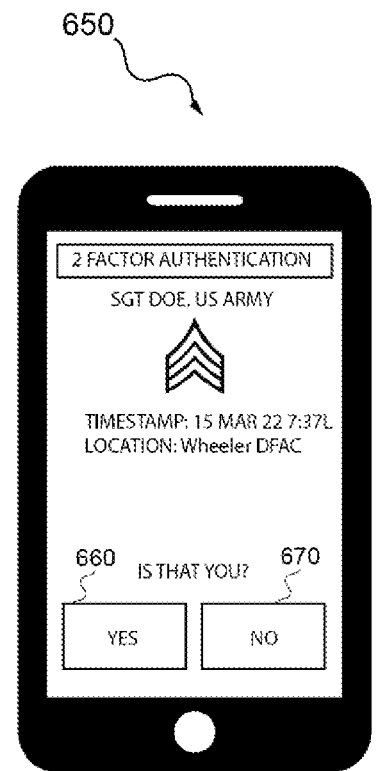
*FIG 6A*                      *FIG 6B*

700

| Exemplary Personnel File Entry | | | | |
|---|---|---|---|---|
| DOD ID No. | CAC Exp. Date | Name (Last, First, MI) | Service | Rank |
| XXXXXXXXXX | 2023-12-31 | Doe, Jane, A. | US Army | Sergeant (E-5) |

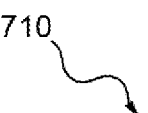

| Exemplary Individual Record File Generated | | | | | |
|---|---|---|---|---|---|
| Last Name | Branch | Rank | Uniform | Date Time Stamp | Location |
| Doe | US Army | Sergeant (E-5) | Dress | 03-04-23; 0705:33 | Wheeler DFAC |

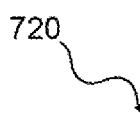

| Hospital Access List | | | | | | |
|---|---|---|---|---|---|---|
| Last Name | First Name | Rank | Branch | Appointment Date | Time | Authetication Req |
| Able | Michael | O-3 | US Navy | 03-04-23 | 0930 | Y |
| Doe | Jon | O-2 | US Army | 03-04-23 | 0700 | Y |
| Flake | Amy | E-6 | US Army | 03-04-23 | 1330 | Y |
| Smith | Eric | E-2 | US Army | 03-04-23 | 1100 | Y |

*FIG 7C*

SYSTEM AND METHOD FOR IDENTIFYING AND AUTHENTICATING UNIFORMED PERSONNEL

CROSS REFERENCE TO RELATED APPLICATION(S)

This application claims the benefit of U.S. Provisional Patent Application No. 63/334,099 filed Apr. 23, 2022, which is herein incorporated by reference in its entirety for all purposes.

GOVERNMENT INTEREST

The invention described herein may be manufactured, used, and licensed by or for the United States Government.

BACKGROUND

1. Technical Field

The present invention pertains to uniformed personnel identification, and more particularly to the identification and database matching of typically worn uniform recognition markers such as nametapes and rank insignia, using computer vision and machine learning techniques, as well as processes to authenticate such data via networked means.

2. Background Art

The following is a tabulation of some prior art that presently appears relevant (and are herein incorporated by reference in their entirety):

| U.S. Patents | | | |
| --- | --- | --- | --- |
| Patent Number | Kind Code | Issue Date | Patentee |
| 7,362,210 | B2 | Apr. 22, 2008 | Bazakos et al. |
| 9,579,068 | B2 | Feb. 28, 2017 | Gelbman et al. |
| 10,817,841 | B1 | Oct. 27, 2020 | Weiss et al. |

3. Background

The identification of uniformed personnel is an essential and regular task at medical clinics, hospitals, dining facilities, gyms, and nearly all on-installation government facilities. Whether for reasons of security or personalized access to facility resources, soldiers are regularly expected to fill out sign-in rosters and additional paperwork or scan their Common Access Card (CAC). In either instance, both uniformed employee and facility representative time is unduly wasted. When aggregated across all uniformed employees, facilities, and installations, the cumulative time lost becomes significant. The cost to identify soldiers further ensures that low-benefit tasks, such as service personalization, are sidestepped. While security-specific requirements are best served by accessing CAC and other means of government identification, personalized access to facility resources rarely requires the level of confidentiality and accuracy allowed by time-hungry identification approaches.

The uniform worn by members of the uniformed services is a quick and easy means of identification. Most utility uniforms include, at a minimum, a nametape and a rank insignia, and many may further include information such as military schooling completed and position. Dress uniforms further showcase medals and awards attained, unit assignment, and more. The uniform itself is, a testament to its name, uniform in appearance despite individual variation. Nametapes, badges, rank insignia, and other recognition markers are in the same relative location for each uniformed member. Ranks for the U.S. Army are available at https://www.army.mil/ranks/, herein incorporated by reference in its entirety. Examples of the various uniform types (e.g., Greens, Combat, Service and Fitness) for the U.S. Army are shown at https://www.army.mil/uniforms/, herein incorporated by reference in its entirety.

Automated systems and methods of detecting rank and other data using information available from the uniform worn are desirable.

SUMMARY OF THE INVENTION

Disclosed are systems, methods and devices for identifying, verifying, and authenticating information attained from an individual's worn uniform. The invention captures images of uniformed members accessing on-installation facilities, uses computer vision filter and machine learning techniques to identify valuable on-uniform information, and then matches that information with a registered database of names for proper identification, verification, and optional authentication. The rapid identification, verification, and authentication of uniformed personnel significantly reduces the need to fill out excessive paperwork, saves valuable time, and generally streamlines bureaucracy across on-installation facilities.

The application of machine learning and computer vision techniques to read, in real-time, uniform specific information may be used to identify uniformed members and allow personalized facility access.

Embodiments of the invention capture images of uniformed members accessing on-installation facilities, uses computer vision filter and machine learning techniques to identify valuable on-uniform information, and then matches that information with a registered database of names for proper identification. Further embodiments offer a system by which to authenticate uniform-derived information using networked means.

The automated recognition of servicemember attribute data from worn uniforms, which are inherently organized displays of such information, is an intuitive and yet largely unexplored opportunity to significantly reduce entrance processing requirements at military installation facilities, while also allowing for the streamlined distribution of individual-specific information related to those facilities. The present invention takes advantage of advances in optical character recognition, object detection, image segmentation, and machine learning and computer vision in general, to reduce bureaucratic and time-intensive processes involving personnel identification and authentication; some embodiments of the present invention may extend this application to not only facility access, but formation accountability, forward operating base security, and much more. Embodiments of the present invention discussed in the detailed description and shown in the drawings are not intended to restrict the scope of identification and authentication applications, but rather, to illuminate the underpinnings and advantages brought about through variations on the invention.

These and other embodiments of the invention are described in more detail below.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a flowchart illustrating an example of the analysis capabilities and decision-making functions of an identification and authentication methodology, in accordance with an embodiment of the present invention.

FIG. 3 depicts a hospital entrance integrating an example of the novel identification and authentication system to support the transfer of appointment information to patients, executed by the computing device, in accordance with an embodiment of the present invention.

FIGS. 6A and 6B depict examples of a two-factor authentication application interface for a mobile device, in accordance with embodiments of the present invention.

FIGS. 7A, 7B and 7C depict exemplary database entries used in the novel systems and processing, in accordance with embodiments of the present invention.

The figures will be discussed in-depth below in the description.

DETAILED DESCRIPTION

Figure 1:
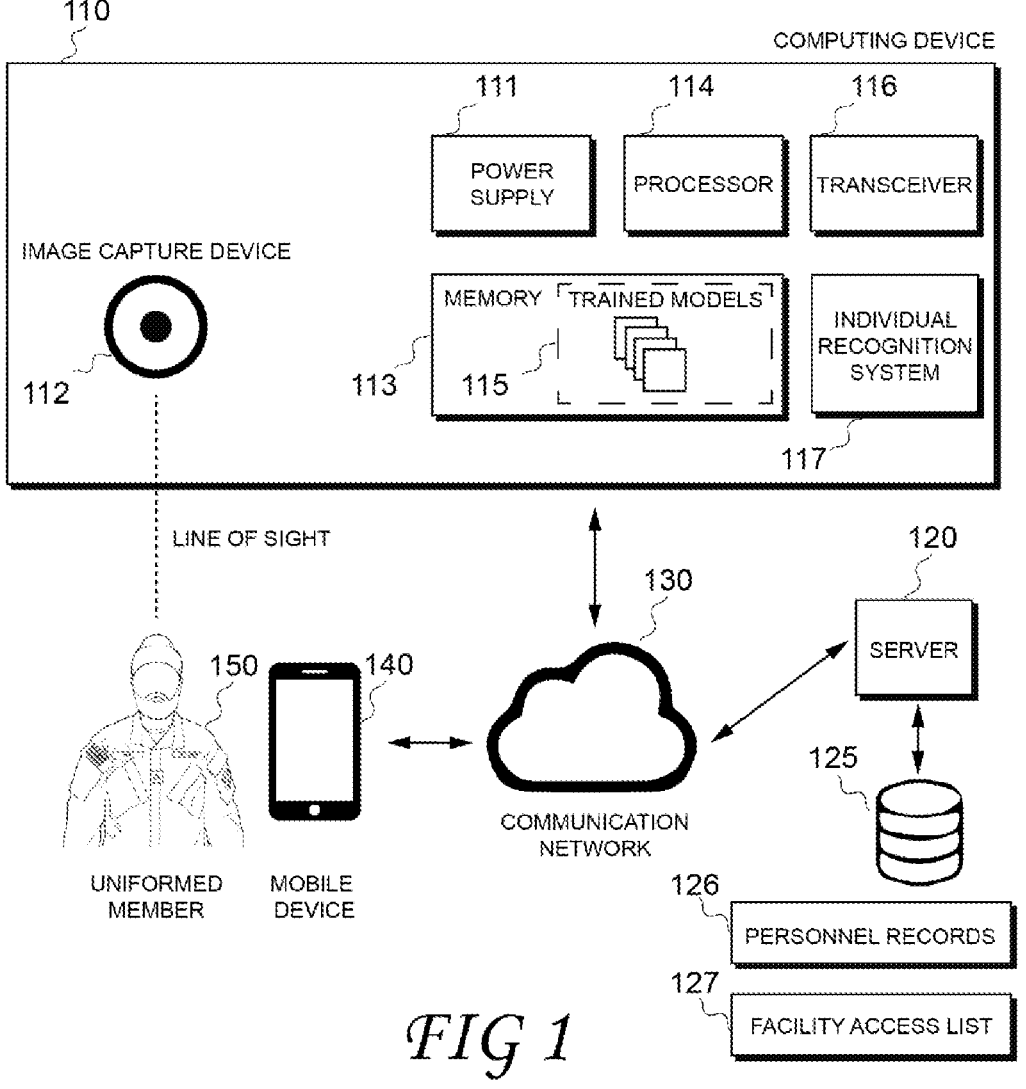
FIG. 1 illustrates an example of the identification and authentication environment, to include subcomponents for an identification and authentication computing device, in accordance with an embodiment of the present invention.

FIG. 1 illustrates an example of a system for identifying and authentication uniformed personnel in accordance with an embodiment of the present invention. It generally includes a computing device 110, generally designated 100. Computing device 110 may include and/or is operatively connected to a power supply 111, image capture device 112, memory 113, processor 114, and transceiver 116. Computing device 110 may also integrate an individual recognition system 117 that does not rely on image capture device 112. Power supply 111 may be an internal battery whose electrical specifications are designed to support various computing device 110 subcomponents. Power supply 111 may also include a power converter designed to translate alternating current power from a connected electrical outlet to the requisite direct current power required for operations.

Image capture device 112 may include one or more cameras strategically positioned and easily adjusted to capture the front-facing portion of uniformed members to facilitate critical computer vision and machine learning tasks. Image capture device 112 can be any camera or imaging system. In some case, it may be an existing security camera for which an output feed can be adapted to the invention. Collected imagery can be still images or streaming imagery over time (like video) in a suitable digital file format (e.g., JPEG, GIF, TIFF, BMP for still images or MPEG, GIFV or AVI). Ideally, it is a high-definition image/video camera for providing clear imagery, such as 2-8 MP resolution for still images and/or 1080p or 4K for video data. A camera which can record and output color image data may be preferred. Multiple cameras positioned in different locations may allow for the collection of uniform data that is not forward-facing, to include unit and combat patches located on the side of the arms and shoulders. Image capture device 112 need not necessarily operate in, or only in, the visual light spectrum, and may further allow for infrared thermography, to include short wavelength infrared (SWIR), medium wavelength infrared (MWIR), and long wavelength infrared (LWIR). Accessing the infrared spectrum may prove valuable for applications covert or discreet in nature. Image capture device 112 may also apply night vision light intensification, which amplifies existing visible light. Image capture device 112 may be used to detect the presence of a person, uniformed or otherwise, to trigger the uniformed member identification and authentication system, using, again, trained machine learning models. Alternatively, an individual recognition system 117 using ultrasonic, microwave, radio, light (e.g., UV, IR or visible spectra), or other non-optical sensors and methods may be integrated into computing device 110 to detect and trigger the uniformed member identification and authentication system when a person is present.

The novel system and methodology according to embodiments may be executed by a suitable processor 114 (or processors) incorporated or otherwise operationally connected to the computing device 110. The processor(s) may be configured to execute ordinary machine-executable instructions to control and operate the radar system in an ordinary manner. Not only for ordinary control, but the processor(s) are further configured to execute machine-executable instructions to implement the novel methodology for identifying, verifying, and authenticating information attained from an individual's worn uniform according to embodiments of the present invention. The processor(s) 114 may be implemented as hardware, software or a combination thereof specifically configured to execute code or instructions necessary to implement embodiments of the present invention. Machine-executable instructions (such as software or machine code) can be stored in a memory 113 and will be executed by the controller as needed. In some implementations, software code (instructions), firmware, or the like, may be stored on a computer or machine-readable storage media.

Processor 114, which may consist of any combination of logical circuitry capable of processing digital information to include ASICs, GPUs, DPUs, and more, may access memory 113, which may consist of any combination of volatile and non-volatile memory to include ROM, EPROM, EEPROM, flash memory, DRAM, and more. It can be or more processor elements such as designated or parallel processors. Processor 114 may execute instructions or access personnel data stored in memory 113 but may also execute instructions or access personnel data and facility lists in a database 125 retrieved from server 120 communicatively coupled to communication network 130 via transceiver 116. Memory 113 may further contain trained machine learning models 115 developed to support invention tasks. Machine learning models of relevance include uniform object detection, branch object detection, rank object detection, nametape optical character recognition, and more. These operations are discussed in more detail below.

The machine-executable instructions may be stored or otherwise part of the memory 113, although, it will be appreciated they could be executed by the processor 114 thereof or, in other implementations, by distinct and separate processors altogether. Additional processors might also be provided. Alternatively, a single processor could be provided which is configured to operate in an analogous manner.

Transceiver 116 includes one or more transceivers capable of receiving and transmitting data across communication network 130. It may include one or more antennas and other requisite hardware and processors for radio communications. Communication network 130 may be any type of wired or wireless network, to include, for example, ethernet, a wireless local area network (WLAN), wireless personal area network (WPAN), wireless metropolitan area network (WMAN), wireless wide area network (WWAN), satellite-based networks, or any combination thereof. Communication network 130 allows computing device 110 to access, for example, personnel attribute data and facility-specific information stored in a database in server 120, which in turns supports individual identification and associated permissions. Server 120 can be a computer system storing or hosting one or more computer databases 125, such as Oracle®. It includes or connects to at least one database of personnel files 126 and/or facility access lists 127.

An exemplary personnel file entry 700 is depicted in FIG. 7A as would be stored in the database(s) 125 connected to server 120. Here, it is adapted for military personnel. Server 120 may comprise or connect to multiple databases. As shown, this non-limiting exemplary personnel file entry 700 includes a Department of Defense (DOD) Identification (ID) number (this is a 10-digit unique identifier for US military personnel); Common Access Card (CAC) expiration date, Name (Last, First MI), Service and Rank. Other fields may be substituted or further included as may be desirable for employment matters, like additional fields for personal information, payroll, security, medical, etc. For the exemplary personnel file entry 700 for Sergeant Doe depicted, the DOD ID No. has been blacked out (with Xs) when displayed for privacy reasons. It would only be available to those with a need to know.

Returning to FIG. 1, communication network 130 also allows computing device 110 to wirelessly push two-factor authentication requests to mobile (computing) devices 140 (e.g., an Apple iPhone® or iPad® or Microsoft Surface®) owned by or provided to servicemembers 150, as well as allows computing device 110 to display facility-specific information relevant to that servicemember, such as appointment time and type, 150 directly on their mobile device 140.

FIG. 2 depicts a flowchart of a computer-implemented algorithm illustrating an example of the analysis capabilities and decision-making functions of an identification and authentication method, generally designated 200, in accordance with an embodiment.

The methodology disclosed herein may be implemented and executed by an application created using any number of programming routines. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Per step 201, method 200 is initially triggered through the detection of a person, whether through optical means using image capture device 112, or non-optical means using individual recognition system 117. Once triggered, step 202 collects one or more image frames using image capture device 112. The collected image frames may be pre-processed and down-selected using a variety of computer-vision techniques to ensure image clarity, reduce image complexity, and allow for formatting in a machine learning friendly manner. For instance, the initial imagery may be magnified, rotated, magnified, etc. to place the individual's uniform as the central focus. Various other image filtering techniques may be applied as well.

Examples of relevant computer vision image pre-processing techniques include grayscale conversion, data augmentation, normalization, shifting, and homography. The collected imagery can be tagged or otherwise associated with date-time stamp and/or location. The latter could be GPS coordinates and/or a simple description of location, e.g., Ft. Rucker (AL) Lysler Army Health Clinic, Bldg 301 patient entry (Main).

Step 203 involves submitting a pre-processed and down-selected frame through a trained branch object detection network to determine the uniformed member service branch per step 204. Service branches in the United States include the Army, Navy, Air Force, Coast Guard, United States Public Health Service, Space Force, and the National Oceanic and Atmospheric Administration. Historically, different service branches have used unique camouflage patterns in their utility uniforms that may be relied on for object detection differentiation. Similarly, dress uniforms across the service branches feature different color sets and design patterns.

Camouflage patterns, color scheme, and the relative location of certain objects (e.g., nametapes, buttons, other insignia) may all be integrated into this branch object detection network. There is flexibility in the selection of which elements may be integrated into the hierarchy of object detection networks.

Figure 4:
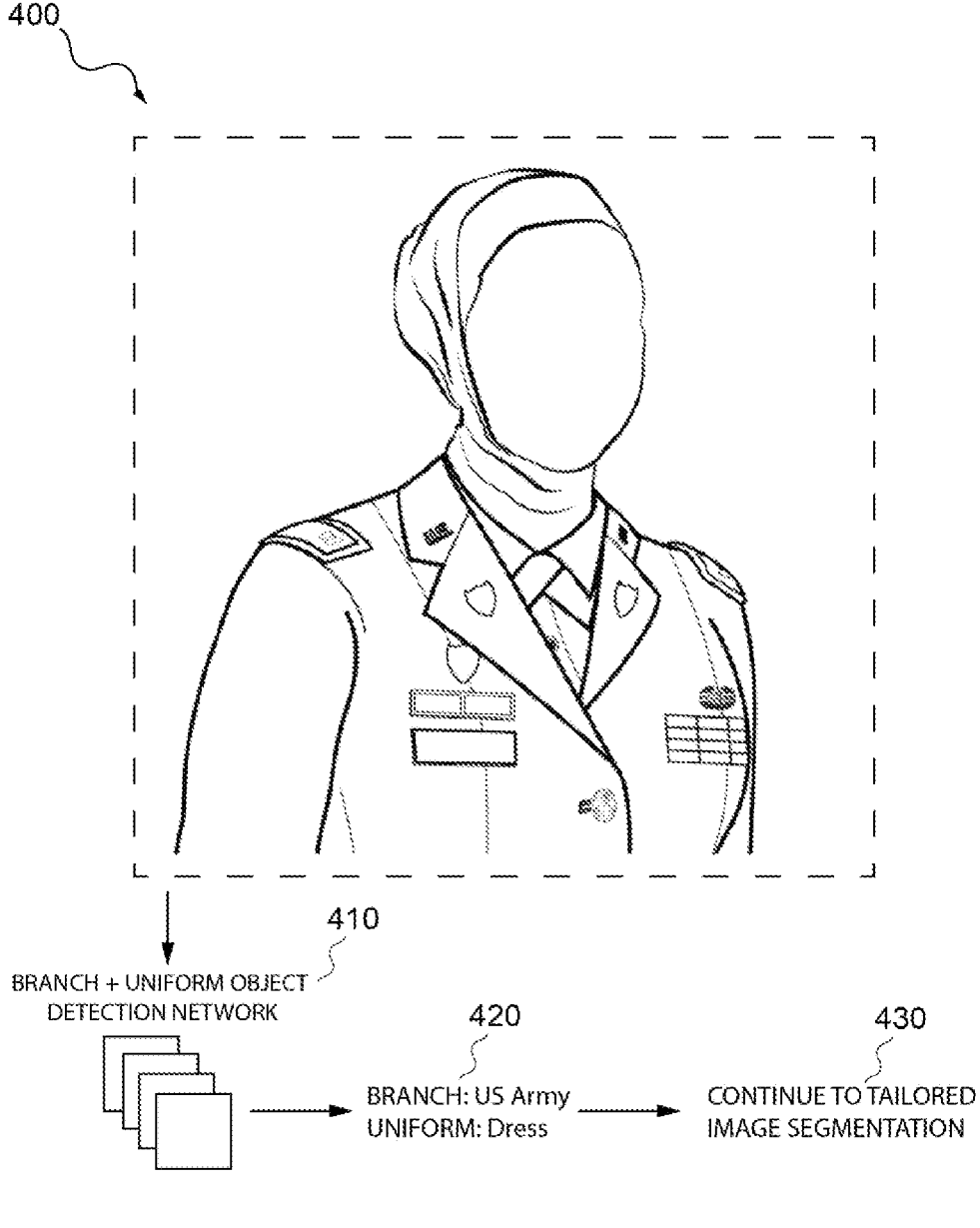
FIG. 4 depicts an example of a combined branch and uniformed object detection network determining servicemember branch and uniform type visually, in accordance with an embodiment of the present invention.

The algorithm depicted in FIG. 2 may utilize distinct branch and uniform machine learning networks and these may be used in some embodiments. More preferably, a trained model may be used to distinguish between both service branch and uniform type. FIG. 4, generally designated 400, depicts an example of a combined branch and uniformed object detection network 410 determining servicemember branch and uniform type visually 420, prior to image segmentation 430.

The uniform object detection network in step 205 and uniform type identification in step 206 may be procedurally placed prior to the branch object detection network and identification steps 203 and 204. Examples of U.S. Army uniform types include utility, dress, service, and fitness, as discussed above.

More particularly, with respect to FIG. 4, the combined branch and uniformed object detection network 410 is configured to visually search and/or compare the uniform imagery to images of known uniform types in the trained branch object detection network. The overlapping four boxes depicted in that drawing is an abstract representation of the hierarchical nature of the neural network, which has several feature maps that end up being modified in unique ways throughout the network. It may be implemented as a convolution neural network (CNN) as one non-limiting example. Such networks exist and may be adapted for the novel methodology as follows.

It is noted that, not all problem sets are suitable for machine learning and computer vision approaches. Appropriate problem sets typically feature a significant amount of data for training, have a high level of uniformity on which to pattern match and simplify processes, and provide enough information to model and filter in an effective manner. The uniform meets all three basic requirements. There are approximate 2.23 million active and reserve uniformed personnel in the United States alone, and each may access on average three on-installation facilities a day, suggesting the potential for nearly 7 million snapshots daily. The uniform provides a significant amount of information on which to pattern match and organizes this information in a standardized manner. Notably, the uniform may lack information deemed critical to certain applications, to include first name. However, the combination of, at a minimum, last name, rank, and service branch, may be enough to positively identify a uniformed member accessing a particular facility.

Figure 5:
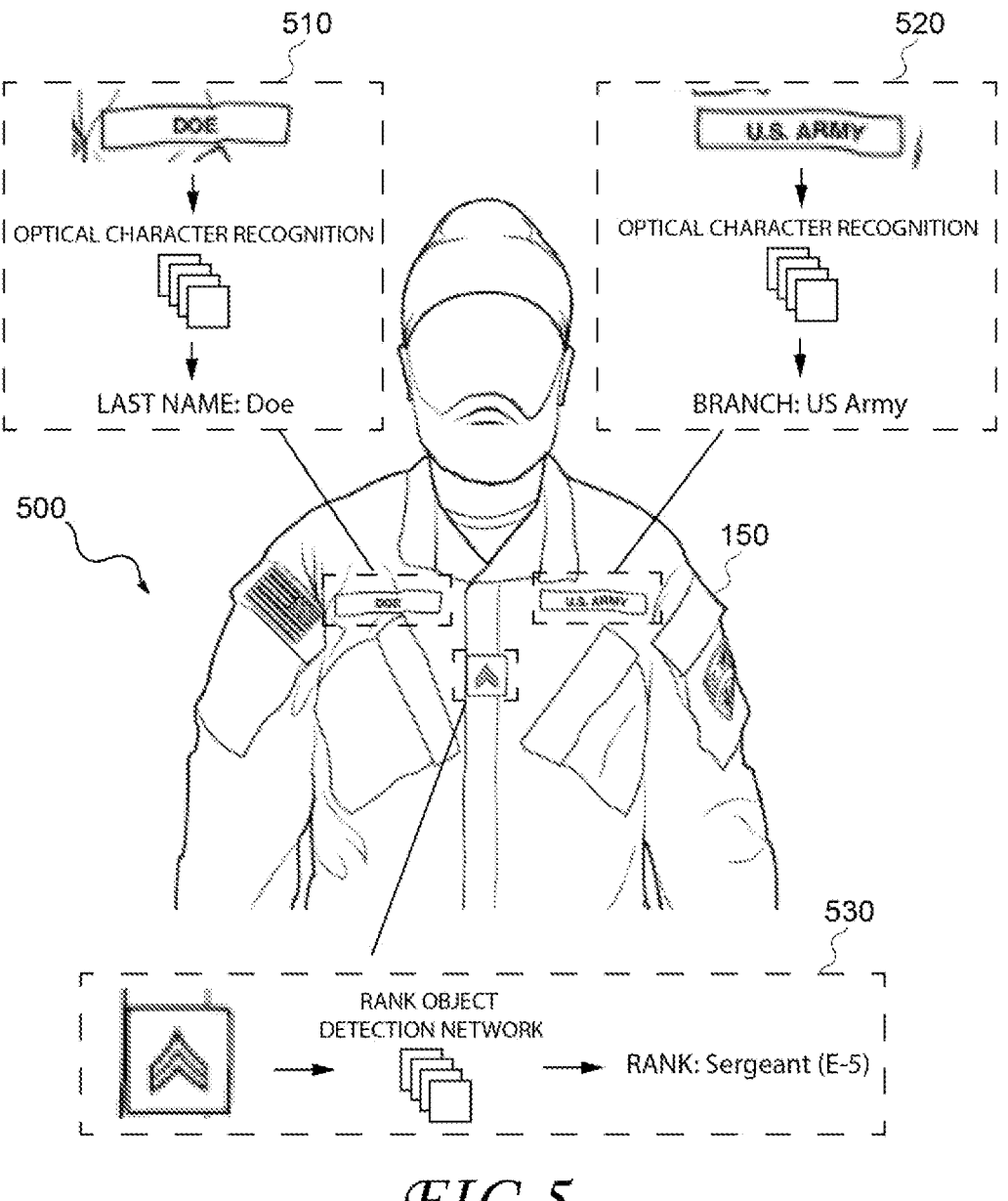
FIG. 5 depicts an example of the use of image segmentation followed by optical character recognition and object detection to attain servicemember attribute data, in accordance with an embodiment of the present invention.

Images of the known uniform types preferable have tags, metadata or are other linked to data which identify it for a particular branch and uniform type. Known image-based search processes may be employed for this purpose. See Microsoft Bing® Image Search API as one non-limiting example which may be employed. In some implementations, the individual's facial features on the imagery may be obscured or omitted for privacy as shown in FIGS. 4 and 5. The image search may provide, as results, best-match image(s) and/may further include match scores. In some implementation, if the best match score fails to achieve a predetermined match score value (e.g., >90%), the process flow may return to step 202 to collect better imagery of the uniform. The process could be repeated multiple times, i.e., until a predetermined number (e.g., 5 times), before termination of step 202; if that case, the best matched image can be used. Here, based on the image searching and associated data with the match, the output 420 makes a determination of "US Army" and "Dress" for the 'Branch' and 'Uniform' fields, respectively of the individual file record to be later generated (see FIG. 7B).

Once branch and uniform type have been identified, and the associated relative location of individual attribute markers of interest is therefore identified, step 207 initiates image segmentation 430 on the pre-processed frame. Image segmentation is a simple and well-known computer vision technique. See, e.g., "Image Segmentation: The Basics and 5 Key Techniques" Datagen, available at: https://datagen.tech/guides/image-annotation/image-segmentation/ herein incorporated by reference in its entirety. It is part of the standard toolset for many image applications (although, it has never before applied to this particular field of consideration, and certainly not as described herein).

According to the novel processing herein, image segmentation can be applied to partition an image into smaller fragments of value; here, those fragments include, in the case of a utility uniform, nametape, rank patch, combat patch, unit patch, and branch patch. Each fragment is labeled and submitted to trained machine learning models specific to the fragment label and associated content. Per step 208, fragments with textual markers, such as nametape and branch patch, may be submitted through optical character recognition networks, whereas fragments with image-based markers, such as rank patch, combat patch, and unit patch, may be submitted through separate object detection networks. The image segmentation employed may be configured to train or focus on specific locations of the uniform for different information. In doing so, it may also look for physical features of the uniform, such as, for example, caps, pockets, button lines or epaulets, as reference points/areas for the uniform image.

FIG. 5 depicts an example of the use of image segmentation followed by object detection and optical character recognition to attain servicemember attribute data, generally designated 500. Optical character recognition processes 510 and 520 depict the translation of nametape and branch patch into text, respectively. For instance, various known optical character recognition or optical character reader (OCR)

algorithms can be employed for this purpose. They may include Open Source ones, like Tesseract OCR or OCRopus, for instance. Or they may include proprietary ones like Google Cloud Vision (GCV) API, Amazon Textract/Rekognition or Microsoft Azure Computer Vision (CV) API to name a few. Their input is a digital image and their output is textual (such as ASCII characters).

Military uniforms have a designated convention for patch or insignia locations. For instance, in the case of the combat uniform for the U.S. Army, as depicted in FIG. 5, the nametape is above the wearer's right chest pocket and the service branch patch is above the wearer's left chest pocket. The rank insignia is generally centered on the uniform, i.e., along the button line between the chest pockets. For other types of uniforms, the locations for rank patches may be different. Rank indicia might also be found on front the wearer's cap or epaulets (shoulder boards) in some cases. (For instance, in FIG. 4, the soldier is wearing the U.S. Army service uniform, where rank is indicated on the epaulets). Other information may be gleaned in this process from the indicia of the uniform; for instance, flags and abbreviations (like "US") may indicate the country of the servicemember. And medals, ribbons, and/or other insignia present on the uniform may provide other important information about the servicemember which could be populated in an individual record file 710 in a similar manner too.

In FIG. 5, the first optical character recognition process 510 is configured to determine the last name from the nametape on the uniform. In the case of the Army, first OCR process 510 is configured and preferably trained to focus on the imagery only in the location above the wearer's right chest pocket (i.e., the dotted line rectangular box superimposed on the uniform which is illustratively depicted as connecting to the sub-image of 510). Here, it takes the image of the nametape and interprets it as "Doe." The output is text for the 'Last Name' field of the individual file record generated (see FIG. 7B). If a uniform includes indicia of a first name or other name information, like a middle name or middle initial, the processing can be also applied for those fields too. Similarly, the second optical character process 520 is configured to determine the military branch from the branch patch on the uniform. In the case of the U.S. Army uniform, the second OCR process 520 is configured and preferably trained to focus on imagery only in the location above the wearer's left chest pocket (i.e., the dotted line rectangular box superimposed on the uniform which is illustratively depicted as connecting to the sub-image 520). Here, it takes the image (or sub-image) of the branch patch and interprets it as "US Army". The output is text for the 'Branch' field of the individual file record generated (see FIG. 7B).

Object detection process 530 is implemented to use the imagery of a rank insignia patch, to determine or recognize the rank from the rank insignia patch. Various known object detection techniques can be employed for this purpose according to embodiments. For instance, see Gaudenz Boesch, "Object Detection in 2023: The Definitive Guide," 2023 viso.ai, available online at: https://viso.ai/deep-learning/object-detection/, herein incorporated by reference in its entirety. They can be adapted for identifying uniforms and elements thereof. Moreover, self-learning or machine-learning techniques can be further applied for greater and continually improving image detection/recognition accuracy. These can include neural networks. For instance, see Johannes Rieke, "Object detection with neural networks—a simple tutorial using keras," Towards Data Science, 2017, available online at: https://towardsdatascience.com/objectdetection-with-neural-networks-a4e2c46b4491, herein incorporated by reference in its entirety. Indeed, there are a variety of existing neural network architectures (e.g., Yolo, R-CNN, or mobilenet to name a few) that may be used for embodiments of the present invention. Regardless of the particular architecture employed, the selected model will "learn" to recognize ranks using a customized data-set specific to embodiments of the invention. The recognition success rate improves over time. To these ends, a suit of digital reference images for insignia and their corresponding ranks may be provided for their detection and learning.

Patch insignia for military rank are composed or various symbols, icons, and/or indicia. For instance, they may comprise V-shaped stripes or chevrons, bars, leaves, stars or animals (e.g., a bird in the case of a Colonel (O-6) in the U.S. Army). Color also plays a factor. Indeed, the same indicia in different colors can signify different ranks. As examples, in the U.S. Army, a single gold bar signifies a Second Lieutenant (O-1) whereas the same bar in silver (or black) signifies a First Lieutenant (O-2). And one gold oak leave signifies a Major (O-4) whereas the same oak leaf in silver (or black) leaf signifies a Lieutenant Colonel (O-5). The reference images may be further 'tagged' for quickly searching. With image tagging (such as in the file metadata), the reference images for insignia can be linked to particular ranks.

In FIG. 5, the object detection process 530 is configured to determine the military rank from the rank patch on the uniform. In the case of the Army, the object detection process 530 is configured and preferably trained to focus on imagery only in the center of the uniform; more particular, this may be along the button line between the chest pockets (i.e., the dotted line rectangular box superimposed on the uniform which is illustratively depicted as connecting to the sub-image 530). Here, it takes the image (or sub-image) of the rank patch, which is the three-chevron indicia, and interprets it as "Sergeant (E5)." The output is text for the 'Rank' field of the individual file record generated (see FIG. 7B).

Returning to FIG. 2, step 209 collects the outputs of the previous steps to assemble and generate an individual record file for the individual with the attained attribute information.

An exemplary individual record file 710 that is generated in step 209 is shown in FIG. 7B. This record 710 may be generated by the mobile device 140 and then transmitted to the server 120 via the communication network 130 for searching the facility access list(s) 127 in database(s) 125. Here, it is adapted for military personnel and generally corresponds to the exemplary personnel file entry 700 depicted in FIG. 7A. As shown, this non-limiting exemplary individual record file 710 includes Last Name, Branch, Rank, Uniform, Date Time Stamp and Location field. Other fields may be substituted or further included as may be desirable.

In step 210, the individual file record assembled from attained attribute information is compared to database(s) of personnel files and for facility access. The database(s) 125, for instance, of personnel records 126 and facility access list(s) 127, may be located in or otherwise connected to server 120 and accessed via communication network 130 or may be stored in computing device 110 memory 113. The comparison may involve a database search process. For example, Structured Query Language (SQL) query commands or the like may be utilized for this process. Some examples of SQL query command are discussed below. The result is a match for one or more file entries in the database(s) 125. The match could be a boolean (exact match) or a best (statistical) match. In some cases, a best match threshold (e.g., >95%) may be applied to filter results.

Assuming the information in the assembled record matches that in the facility database per step 211, the individual is verified and verification procedures are conducted in step 214. Successful verification procedures vary between facilities; for an on-installation gym, it may simply involve continued access, whereas for a dining facility, it may involve access as well as an emailed or texted menu of the day's dining options.

Post-verification processes may further be initiated. In embodiments, the identifying, verifying, and authenticating information attained from an individual's worn uniform, may be judiciously used for: (i) physical entry, such as (a) locking/unlocking doors and windows, and/or (b) opening/closing door or turnstiles; (ii) enable automated reception, such as to "check-in" for appointments and events; and (iii) access information technology systems and databases which may be used in addition to or as an alternative to conventional means (such as using a login and password). Such systems, such as those for physical entry (e.g., doors, turnstiles, windows, etc.), registration system, and IT systems, may be further connected to the computing device 110 via the communication network 130 for their involvement. In verifying, the information can be used to searching so-called "whitelists" (specifically identifies only those authorized), "blacklists" (specifically identifies only those denied access), or both, for a facility. These lists may be further revised based on successful or failed verification. For an automated door system, upon successful verification of the individual, a signal may be transmitted to the door's controller to unlock and/or open the door to permit entry for that person.

Failed verification procedures per step 212 vary with facility; it is typically assumed that CAC scanning or written forms will be relied on in instances where embodiments may fail due to technical limitations or when there is no identified match in the database. Other actions may occur for failed verification, such as alerting security personnel and/or bolstering physical security like locking doors.

The method 200 may end there in some embodiments. However, in other embodiments, authentication beyond verification may be required in any facility for which an additional level of clearance is required, for example. If authentication is required, an authentication alert is transmitted to the mobile device 140 associated with the phone number in the servicemember's assembled record or database file.

Continuing from step 211, a determination of whether authentication is required is performed in step 213. If NO, successful verification procedures result per step 214. Otherwise, if YES, in step 215, an authentication alert may be generated and be transmitted to the mobile device(s) 140 associated with identified person(s) for implementing two-factor authentication (2FA). At decision step 216, it is determined whether the two-factor authentication was successful. If YES, successful verification procedures result per step 214. If NO, the unsuccessful authentication triggers failed authentication procedures 217. Step 217 may execute one or more processes which are the same or similar as step 214. Although, preferably, in some implementations and embodiments, employ more rigorous actions. For instance, step 217 may implement one or more of the following: the placement of security and fraud alerts, the freezing of account or system access, and the initiation of an investigation.

Various third-party application programming interfaces (APIs) for performing multi- and two-factor authentication are known and can be incorporated into method 200. Some non-limiting examples include: Authy by Twilio, Verify API by Vonage, FortyTwo Two-Factor Authentication API, Curity Authentication Service, Identity Automation, Auth0 API, OneLogin API and Authenticating.com API. Most of these APIs allow for the listing of the interface information discussed herein, and passcode capability too. It would be a relatively simple integration.

FIGS. 6A and 6B depict examples of a two-factor authentication application interface for a mobile device 140, in accordance with embodiments of the present invention. FIG. 6A, generally designated 600, depicts an example of a two-factor authentication (2FA) application interface for a mobile device 140. For security reasons, the graphical user interface may include identifying information about the incoming request 610, to include request timestamp and location. A pin or passcode 620 may be included in the message as deemed appropriate by the requesting party, should a further layer of authentication be required. In some implementations, as illustrated in FIG. 6A, the servicemember may be asked to and enter the passcode 620 in a separate terminal as part of authentication process. Additional instructions 630 may be displayed on the mobile device to assist the servicemember in doing so.

In other implementations and embodiments, as shown in FIG. 6B, an authentication request (message) is transmitted and displayed which request the servicemember(s) to appropriately verify themselves. For instance, as shown, the servicemember may be provided the option to select YES 660 or NO 670 when prompted. Per step 216, selecting YES results in successful authentication and verification, and selecting NO results in unsuccessful authentication. Unsuccessful authentication triggers failed authentication procedures 217, which may involve one or more of the following: the placement of security and fraud alerts, the freezing of account access, and the initiation of an investigation.

FIG. 3 depicts a hospital entrance integrating an exemplary application of the novel identification and authentication system to support the transfer of appointment information to patients, generally denoted 300, in accordance with an embodiment of the present invention. As the servicemember in uniform walks into a military hospital where he enters within line of sight of the image capture device (located inside at the upper right), which is connected to the computing device and a digital display. The door may be transparent so that image capture device can peer through it; although, the image capture (or another one) might be located outside. The system collects imagery of the servicemember in uniform, identifies associated uniform markers of interest, and develops a temporary personnel file on the servicemember with information to include name, rank, and branch following the method 200 in FIG. 2. Given the safeguards required for medical information, the servicemember receives a push notification to his mobile device 140 asking him to confirm his identity, which he does.

FIG. 7C shows an exemplary hospital access list 720. It provides a list of individuals and their corresponding appointment times. This list 720 may be stored in the facility access list 127 in the database 125 included in or otherwise connected to server 120 shown in FIG. 1. Fields may include Last Name, First Name, Rank, Branch, Appointment Date and Time, and whether Authorization is required. This is an example of a whitelist meaning the individual name must be on the list for entry. The system and device, used as part of authentication and/or verification, can search/query the hospital's appointment list to see if the individual is on it. It may also look ensure the same date and that the time stamp is within a predetermined time range (e.g., ±5-30 minutes) of the appointment time. Scanning the exemplary record in FIG. 7C, it can be inferred with high-level of probability that Jon Doe, a 1Lt, has arrived and is verified/authenticated. Having been verified and/or authenticated, the door can be unlocked and opened and a welcome message can be displayed on the screen in the lobby welcoming Lt. Doe by rank and name as he enters. He can further receive other appointment information to include directions to reception via his mobile device. Additionally, in some implementations, Lt. Jon Doe may be automatically "checked-in" to the hospital reception system, and/or other procedures are implemented relating the appointment (such as generating message(s) notifying medical staff). This reduces the need to fill out excessive paperwork and saves valuable time. The whole process is preferably fast and seamless with no noticeable delay for the individual.

Below is an exemplary Structured Query Language (SQL) command that may be used in embodiments:

SELECT*FROM "Exemplary Personnel File Entry" WHERE "Name (Last, First, MI)" in ("Doe, Jane, A.")

The SQL query returns the entire row of information from table named "Exemplary Personnel File Entry" for each row where the value of column "Name (Last, First, MI)" is equal to "Doe, Jane, A."

Naturally, there may be some pre- and post-processing required, and which may be in a language that is not SQL. Once a uniform is scanned for the information on the nametapes, the attained information is assembled to match that of the column order "Name (Last, First, MI)", and then the SQL query above can be run. If the return is empty, that is equivalent to a boolean false, whereas if the return is not empty, that is equivalent to a boolean true for access purposes. It is essentially the same for the hospital access table in FIG. 7C, as shown below, now with two or more WHERE conditions:

SELECT*FROM "Hospital Access List" WHERE "Last Name" in ("Able") AND "First Name" in ("Michael") AND "Rank" in ("O-3") AND "Branch" in ("US Navy")

In further embodiments, the novel methods, systems, devices and processes may be combined with other known verification means, like Common Access (CAC) cards (ID number with or without pin number) and biometrics (e.g., fingerprint(s), facial scans, and iris/retinal scans) as a few non-limiting examples. Thus, the uniform provides additional information about the individual (wearer).

While the description above has primarily been with respect to the U.S. military uniforms, it shall be appreciated that other embodiments may accommodate other uniforms and their conventions for other rank-based entities. These may include, but are not necessarily limited to, foreign militaries, government personnel, police, fire and emergency medical services (EMS) departments' personnel, Boys and Girls Scouts, fraternal organizations, clergy, etc.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system for identifying, verifying, and authenticating information attained from an individual's worn uniform, the system, comprising:
   a communication network;
   a server comprising a database of personnel files;
   an image capture device comprising one or more cameras to provide imagery of an individual's worn uniform; and
   a computing device configured to:
      locate and identify predetermined uniform recognition markers in the imagery from the image capture device;
      assemble an individual record file using information contained in the identified uniform recognition markers;
      search the database for one or more personnel files based on the assembled individual record file; and
      signal successful or failed verification as a result of the search.

2. The system of claim 1, wherein in searching the database for one or more personnel files based on the assembled individual record file, the computing device is further configured to:
   compare the assembled individual record file to the one or more personnel files to determine a match.

3. The system of claim 1, wherein the computing device is further configured to:
   transmit an authentication request to a mobile device associated with at least one of the one or more personnel files and accessible through the communication network; and
   signal successful or failed authentication following action or inaction on the authentication request from a user of the mobile device.

4. The system of claim 1, wherein the image capture device comprises multiple cameras placed in various locations to collect imagery of an individual's worn uniform.

5. The system of claim 1, wherein the image capture device comprises one or more cameras that operate in the non-visible spectrum and/or cameras that apply night vision light-intensification.

6. The system of claim 1, wherein the location and identification of uniform recognition markers utilizes image segmentation followed by optical character recognition for text and/or image searching for non-text.

7. The system of claim 1, wherein the location and identification of uniform recognition markers uses computer vision and machine learning techniques.

8. The system of claim 1, wherein the uniform recognition markers located and identified include, at a minimum, nametape, rank patch, and branch patch.

9. The system of claim 1, wherein the verification comprises determining if one or more retrieved personnel files are entries on a whitelist or blacklist of a facility.

10. The system of claim 1, further comprising: an individual recognition system which includes ultrasonic, microwave, radio, light or other non-optical sensors which is triggered by the presence of an individual.

11. A method for identifying, verifying, and authenticating information attained from an individual's worn uniform, executed by a computing device programmed to perform the method, the method comprising:
   receiving from an image capture device comprising one or more cameras to provide imagery, at the computing device, of an individual's worn uniform;
   locating and identifying, using the computing device, predetermined uniform recognition markers from the imagery output from the image capture device;
   assembling an individual record file, using the computing device, compiled from information contained in the identified uniform recognition markers;
   searching a server comprising a database communicatively coupled to the communication network, using the computing device, for one or more personnel files based on the assembled individual record file; and
   signaling, using the computing device, successful or failed verification as a result of the search.

12. The method of claim 11, wherein in searching the server, the method further comprising:
   comparing the assembled individual record file to the one or more personnel files to determine a match.

13. The method of claim 12, wherein the comparison comprises performing a Structured Query Language (SQL) query.

14. The method of claim 11, further comprising:
   transmitting an authentication request to a mobile device associated with at least one of the one or more personnel files and accessible through the communication network; and
   signaling successful or failed authentication following action or inaction on the authentication request from a user of the mobile device.

15. The method of claim 14, further comprising, in response to successful verification and/or authentication, (i) enabling physical entry; (ii) enabling automated reception and/or (iii) accessing information systems.

16. The method of claim 11, wherein locating and identifying uniform recognition markers comprises utilizing image segmentation followed by optical character recognition for text and/or image searching for non-text.

17. The method of claim 11, wherein locating and identifying uniform recognition markers uses computer vision and machine learning techniques.

18. The method of claim 17, further comprising: providing a suit of digital images of digital reference images for insignia and their corresponding ranks for detection and learning.

19. The method of claim 17, further comprising: providing a suit of digital images of digital reference images for uniform types for detection and learning.

20. The method of claim 11, wherein the verification comprises determining if one or more retrieved personnel files are entries on a whitelist or blacklist of a facility.

21. A computing device having computer-executed instructions stored in memory that, when executed by at least one processor implement a method for identifying, verifying, and authenticating information attained from an individual's worn uniform, configuring the device to:
   locate and identify predetermined uniform recognition markers in imagery of an individual's worn uniform from an image capture device;
   assemble an individual record file using information contained in the identified uniform recognition markers;
   retrieve from a database one or more personnel files;
   compare the assembled individual record file to the one or more personnel files;

signal successful or failed verification as a result of the
comparison of one or more personnel files;

transmit an authentication request to a mobile device
associated with at least one of the one or more person-
nel files and accessible through the communication
network; and signal successful or failed authentication following action
or inaction on the authentication request.

22. The system of claim 1, wherein records in the per-
sonnel files stored in the database comprise: an identifier, a
name, a military service branch, and a rank.

23. The system of claim 9, wherein the whitelist com-
prises: a name, a military service branch, rank and appoint-
ment date and/or time.

24. The system of claim 1, wherein the verification of an
individual occurs substantially in real-time with the imaging
of the individual.

25. The method of claim 11, wherein the verification of an
individual occurs substantially in real-time with the imaging
of the individual.

\* \* \* \* \*